United States Patent
Lu

(10) Patent No.: US 7,650,449 B2
(45) Date of Patent: Jan. 19, 2010

(54) COMMUNICATION SYSTEM FOR DEVICES WITH UART INTERFACES

(75) Inventor: Chung-Ming Lu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 170 days.

(21) Appl. No.: 11/838,242

(22) Filed: Aug. 14, 2007

(65) Prior Publication Data

US 2008/0235416 A1 Sep. 25, 2008

(30) Foreign Application Priority Data

Mar. 19, 2007 (TW) ................................. 96109274

(51) Int. Cl.
*G06F 13/24* (2006.01)
(52) U.S. Cl. ...................... 710/106; 710/314; 710/110; 710/317
(58) Field of Classification Search ............. 710/29–33, 710/62–64, 72–73, 107, 305–306, 313–317, 710/104–110
See application file for complete search history.

(56) References Cited

U.S. PATENT DOCUMENTS

| | | | | |
|---|---|---|---|---|
| 5,923,670 A | * | 7/1999 | Lee et al. ..................... 370/521 |
| 5,999,992 A | * | 12/1999 | Grohoski et al. .............. 710/29 |
| 6,119,053 A | * | 9/2000 | Taylor et al. ................. 700/231 |
| 6,192,423 B1 | * | 2/2001 | Graf ............................. 710/31 |
| 6,496,892 B1 | * | 12/2002 | Lake et al. ................... 710/301 |
| 6,883,055 B2 | * | 4/2005 | Chen et al. ................... 710/302 |
| 6,885,978 B2 | | 4/2005 | Chu et al. |
| 7,398,336 B2 | * | 7/2008 | Feng et al. .................... 710/36 |
| 7,447,823 B2 | * | 11/2008 | Ise ............................. 710/305 |
| 7,457,847 B2 | * | 11/2008 | Ramey ........................ 709/217 |
| 2008/0183940 A1 | * | 7/2008 | Lou ............................ 710/316 |

* cited by examiner

Primary Examiner—Raymond N Phan
(74) Attorney, Agent, or Firm—Zhigang Ma

(57) ABSTRACT

A UART interface communication circuit includes a plurality of communication devices, and each includes a UART interface, a selecting apparatus, a CPU, and a multiplexer (MUX). The communication devices connect with each other via the UART interfaces thereof. The selecting apparatus is connected to the CPU for defining one of the communication devices as a master communication device and the rest as slave communication devices. The MUX is connected between the UART interface and the CPU. When the master communication device transmits data carrying an ID to the slave communication devices, a slave communication device corresponding to the ID receives and processes the data, and transmits return data to the master communication device, and then the MUX receives the return data from the slave communication device and passes it to the CPU of the master communication device for processing.

15 Claims, 2 Drawing Sheets

COMMUNICATION SYSTEM FOR DEVICES WITH UART INTERFACES

BACKGROUND

1. Field of the Invention

The present invention relates to communication circuits, and particularly to a communication circuit for universal asynchronous receiver/transmitter (UART) interfaces.

2. Description of Related Art

Generally speaking, UARTs are commonly used with some communication standards such as RS-232, RS-422 and RS-485 for embedded systems communications. UART interfaces such as RS-232 ports are commonly used in computer serial ports, enabling communication between two computers. However, the UART interface does not enable communication between more than two computers.

What is desired, therefore, is to provide a UART interface communication circuit which overcomes the above problem.

SUMMARY

An embodiment of a UART interface communication circuit includes a plurality of communication devices, and each includes a UART interface, a selecting apparatus, a CPU, and a multiplexer (MUX). The communication devices connect with each other via the UART interfaces thereof. The selecting apparatus is connected to the CPU for defining one of the communication devices as a master communication device and the rest as slave communication devices. The MUX is connected between the UART interface and the CPU. When the master communication device transmits data carrying an ID to the slave communication devices, a slave communication device corresponding to the ID receives and processes the data, and transmits return data to the master communication device, and then the MUX receives the return data from the slave communication device and passes it to the CPU of the master communication device for processing.

Other advantages and novel features of the present invention will become more apparent from the following detailed description of an embodiment when taken in conjunction with the accompanying drawings, in which:

DETAILED DESCRIPTION

Figure 1:
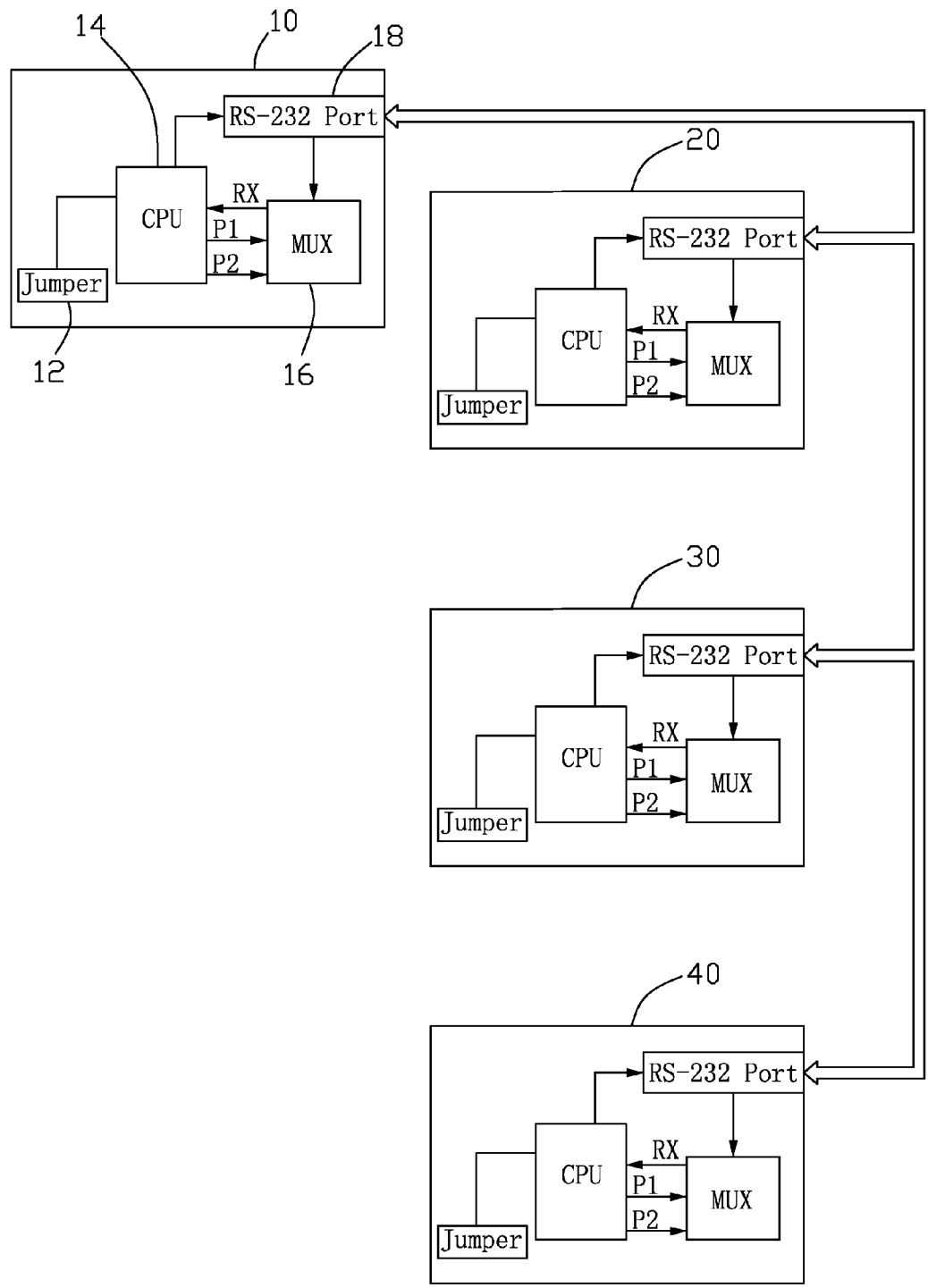
FIG. 1 is a circuit diagram of a UART interface communication circuit in accordance with an embodiment of the present invention.

Referring to FIG. 1, a UART interface communication circuit in accordance with an embodiment of the present invention includes a plurality of communication devices such as four similar computers 10, 20, 30 and 40. The computer 10 includes a selecting apparatus such as a jumper 12, a central processing unit (CPU) 14, a multiplexer (MUX) 16, and a UART interface such as an RS-232 port 18. The computers 20, 30, and 40 also each include a jumper, a CPU, an MUX, and a RS-232 port.

In the computer 10, the jumper 12 is electrically connected to the CPU 14. Two control pins P1 and P2 of the CPU 14 are connected to two selecting pins of the MUX 16. An output terminal of the MUX 16 is connected to a data-receiving pin RX of the CPU 14.

The computers 10, 20, 30, and 40 are defined as one master communication device and three slave communication devices via adjusting corresponding jumpers thereof. In this embodiment, the computer 10 is defined as the master communication device, and the computers 20, 30, and 40 are defined as the slave communication devices. The computers 10, 20, 30, and 40 connect with each other via the RS-232 ports 18 thereof for communication. The computers 10, 20, 30, and 40 also can be defined as master and slave communication devices via software programming to replace the jumpers according to need.

Figure 2:
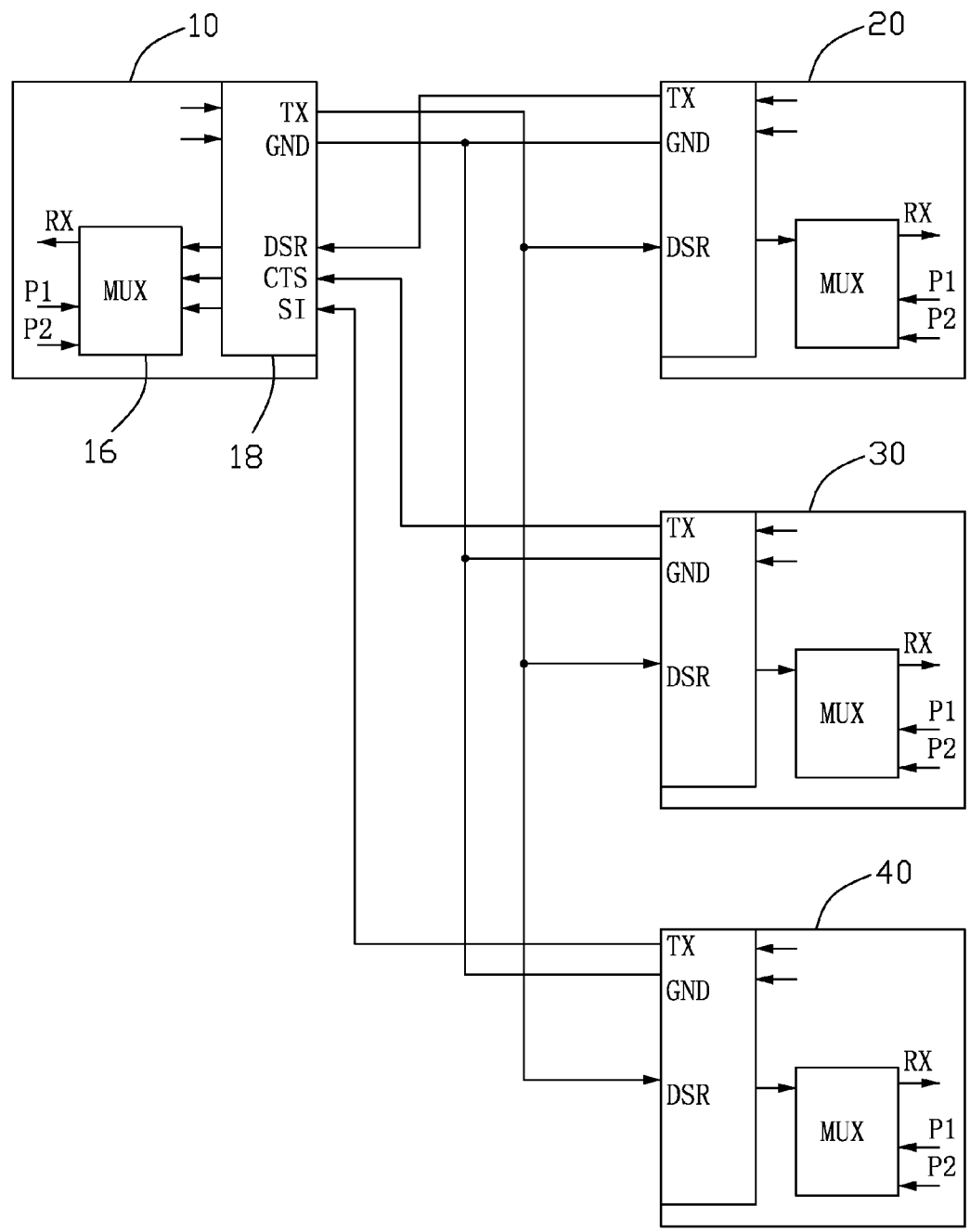
FIG. 2 is a partial circuit diagram of FIG. 1.

Referring also to FIG. 2, the RS-232 port of each of the computers 10, 20, 30, and 40 includes a transmitting pin TX, a ground pin GND, and three receiving pins DSR, CTS, and SI. The transmitting pin TX of the RS-232 port 18 of the computer 10 transmits data to the receiving pins DSR of the RS-232 ports of the computers 20, 30, and 40. The transmitting pins TX of the RS-232 ports of the computers 20, 30, and 40 respectively transmit return data to the receiving pins DSR, CTS, and SI of the RS-232 port 18 of the computer 10. The ground pins GND of the RS-232 ports of the computers 10, 20, 30, and 40 are connected together. Other pins (not shown) of the RS-232 ports of the computers 10, 20, 30, and 40 are not used in this embodiment, if the slave communication devices are more than three, the other pins of the RS-232 ports of the computers 10, 20, 30, and 40 can be used according to need.

When using the computers 10, 20, 30, and 40, if a user needs the computer 10 (master communication device) to communicate with the computer 20 (slave communication device), the computer 10 transmits data to the receiving pins DSR of the RS-232 ports of the computers 20, 30, and 40 via the transmitting pin TX of the RS-232 port 18 of the computer 10. The data includes an ID at the beginning thereof matching with an ID of the computer 20. When the computers 20, 30, and 40 receive the data, the CPUs of the computers 20, 30, and 40 check if the ID of the data matches with the ID thereof. If the ID of the data matches with the ID of the computer 20, the CPU of the computer 20 receives the data and continues to process the data, and the CPUs of the computers 30 and 40 do not process the data. The computer 20 transmits return data to the receiving pin DSR of the RS-232 port 18 of the computer 10, and then the CPU 14 of the computer 10 controls the MUX 16 to receive the return data from the computer 20 and pass it to the CPU 14 and continues to process it. Thus, the computers 10 and 20 communicate with each other. In this embodiment, the relationship between the control pins P1 and P2 of the CPU 14 and the MUX 16 of the computer 10 is as follows:

| Voltage of P1 | Voltage of P2 | Receiving pin |
| --- | --- | --- |
| 0 | 0 | DSR |
| 0 | 1 | CTS |
| 1 | 0 | SI |

Where "0" denotes a low voltage level, and "1" denotes a high voltage level. The "DSR", "CTS", and "SI" respectively denote that the MUX 16 of the computer 10 receives data from the receiving pins DSR, CTS, and SI of the RS-232 port 18 of the computer 10. Because the receiving pins DSR, CTS, and SI of the RS-232 port 18 of the computer 10 correspond to the computers 20, 30, and 40 respectively, the voltages of the control pins P1, P2 correspond to the computers 20, 30, and 40.

If a user needs the computer 10 to communicate with other computers 30 or 40, the data including an ID at the beginning is changed to match with the ID of the computer 30 or 40. The UART interface communication circuit easily enables one computer to communicate with a plurality of other computers. Further, the circuit configuration is very simple, reducing costs.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A communication system comprising:
   a plurality of communication devices, each of the communication devices comprising:
   a universal asynchronous receiver/transmitter (UART) interface, the communication devices connecting with each other via the UART interfaces thereof;
   a central processing unit (CPU);
   a selecting apparatus connected to the CPU for defining one of the communication devices as a master communication device and the rest as slave communication devices; and
   a multiplexer (MUX) connected between the UART interface and the CPU, the master communication device transmitting data carrying an ID to the slave communication devices according to the definition by the selecting apparatus, a slave communication device corresponding to the ID receiving and processing the data, and transmitting return data to the master communication device, and the MUX of the master communication device receiving the return data from the slave communication device and passes it to the CPU of the master communication device for processing.

2. The communication system as claimed in claim 1, wherein a transmitting pin of the UART interface of the master communication device is configured for transmitting the data to a receiving pin of the UART interface of each of the slave communication devices, a transmitting pin of the UART interface of each of the slave communication devices is configured for transmitting the return data to a corresponding receiving pin of the UART interface of the master communication device.

3. The communication system as claimed in claim 1, wherein a plurality of control pins of the CPU of each of the communication devices are connected to selecting pins of the MUX thereof, an output terminal of the MUX of each of the communication devices is connected to a data-receiving pin of the CPU thereof.

4. The communication system as claimed in claim 1, wherein the selecting apparatus are jumpers.

5. The communication system as claimed in claim 1, wherein the UART interfaces are RS-232 ports.

6. The communication system as claimed in claim 1, wherein the communication devices are computers.

7. A communication system comprising:
   a plurality of communication devices, each of the communication devices comprising:
   a universal asynchronous receiver/transmitter (UART) interface, the communication devices connecting with each other via the UART interfaces thereof
   a central processing unit (CPU) defining one of the communication devices as a master communication device and the rest as slave communication devices via software programming; and
   a multiplexer (MUX) connected between the UART interface and the CPU, the master communication device transmitting data carrying an ID to the slave communication devices according to the definition by the selecting apparatus, a slave communication device corresponding to the ID receiving and processing the data, and transmitting return data to the master communication device, and then the MUX of the master communication device receiving the return data from the slave communication device and passes it to the CPU of the master communication device for processing.

8. The communication system as claimed in claim 7, wherein a transmitting pin of the UART interface of the master communication device is configured for transmitting the data to a receiving pin of the UART interface of each of the slave communication devices, a transmitting pin of the UART interface of each of the slave communication devices is configured for transmitting the return data to a corresponding receiving pin of the UART interface of the master communication device.

9. The communication system as claimed in claim 7, wherein a plurality of control pins of the CPU are connected to selecting pins of the MUX, an output terminal of the MUX is connected to a data-receiving pin of the CPU of each of the communication devices.

10. The communication system as claimed in claim 7, wherein the UART interfaces are RS-232 ports.

11. The communication system as claimed in claim 7, wherein the communication devices are computers.

12. A communication system comprising:
    a master communication device comprising a universal asynchronous receiver/transmitter (UART) interface, a central processing unit (CPU), a multiplexer (MUX) connected between the UART interface and the CPU, and a selecting apparatus connected to the CPU for defining the master communication device; and
    a plurality of slave communication devices coupled to the master communication in parallel, each of the slave communication devices comprising a UART interface, a CPU, and a MUX connected between the UART interface and the CPU, and a selecting apparatus connected to the CPU for defining the plurality of slave communication devices;
    wherein the UART interface of the master communication device is coupled to the UART interface of each of the slave communication devices such that the master communication device is capable of transmitting data carrying an ID to the slave communication devices to allow one of the slave communication devices corresponding to the ID receiving and processing the data, and transmitting return data to the master communication device, and the MUX of the master communication device is capable of receiving the return data from the slave communication device and passes it to the CPU of the master communication device for further processing.

13. The communication system as claimed in claim 12, wherein the UART interface of the master communication device has a transmitting pin coupled to a receiving pin of the UART interface of each of the slave communication devices for transmitting the data thereto, and a plurality of receiving pins respectively coupled to transmitting pins of the UART interface the slave communication devices for receiving the return data therefrom.

14. The communication system as claimed in claim 12, wherein each of the CPU has a plurality of control pins respectively coupled to selecting pins of the corresponding MUX, and a data-receiving pin coupled to an output terminal of the corresponding MUX.

15. The communication system as claimed in claim 12, wherein all of the UART interfaces are RS-232 ports.

* * * * *